United States Patent
Miura et al.

[11] Patent Number: 6,153,688
[45] Date of Patent: Nov. 28, 2000

[54] AQUEOUS POLYTETRAFLUOROETHYLENE DISPERSION COMPOSITION AND USE THEREOF

[75] Inventors: Toshiro Miura; Tadáo Hayashi, both of Settsu, Japan

[73] Assignee: Daikin Industries, Ltd., Osaka, Japan

[21] Appl. No.: 08/913,991

[22] PCT Filed: Mar. 26, 1996

[86] PCT No.: PCT/JP96/00778

§ 371 Date: Sep. 29, 1997

§ 102(e) Date: Sep. 29, 1997

[87] PCT Pub. No.: WO96/30445

PCT Pub. Date: Oct. 3, 1996

[30] Foreign Application Priority Data

Mar. 31, 1995 [JP] Japan ................... 7-100606

[51] Int. Cl.$^7$ ............... C08K 5/06; C08L 27/18
[52] U.S. Cl. ............ 524/546; 524/366; 524/544; 524/545; 524/376
[58] Field of Search ............... 524/376, 366, 524/544, 545, 546

[56] References Cited

U.S. PATENT DOCUMENTS 3,705,867 12/1972 Holmes .
5,218,031 6/1993 Nayder et al. .................. 524/376

FOREIGN PATENT DOCUMENTS 4817542 5/1973 Japan .................... 524/376
6055070 3/1985 Japan .................... 524/376
2206656 8/1990 Japan .................... 524/376

OTHER PUBLICATIONS

English Abstract of JP–A–5–339,537—Kobayashi et al, 1993.
English Abstract of JP–A–4–168,170—Yamada et al, 1992.
English Abstract of JP–A–8–046,932—Tanaka et al, 1996.
English Abstract of JP–A–5–320,360—Tabata et al, 1993.
English Abstract of JP–A–3–001,442—Oda et al, 1991.
English Abstract of JP–A–3–147,254—Tsuchiya et al, 1991.

*Primary Examiner*—Fred Zitomer
*Attorney, Agent, or Firm*—Arent Fox Kintner; Plotkin & Kahn, PLLC

[57] ABSTRACT

The present invention provides an aqueous polytetrafluoroethylene dispersion composition characterized in that the composition comprises 30 to 65 wt. % of polytetrafluoroethylene and a polyoxyethylene alkyl ether in an amount of 2 to 10 wt. % based on the polytetrafluoroethylene, the polyoxyethylene alkyl ether being represented by the formula $$RO(CH_2CH_2O)nH$$

wherein R is a saturated or unsaturated hydrocarbon group having 8 to 18 carbon atoms, and n is 5 to 18, having a cloud point of over 45° C. to not higher than 85° C. and containing 65 to 70 wt. % of ethylene oxide in the molecule.

15 Claims, 1 Drawing Sheet

AQUEOUS POLYTETRAFLUOROETHYLENE DISPERSION COMPOSITION AND USE THEREOF

TECHNICAL FIELD

The present invention relates to a composition which is an aqueous polytetrafluoroethylene dispersion as concentrated, and to the use thereof. The aqueous polytetrafluoroethylene dispersion composition of the invention is useful, for example, for coating base materials such as glass fibers, carbon fibers and aramide fibers (hereinafter referred to as "fibrous base materials") for preparing conveyor belts, roof materials (tent fabrics) for architectural fabric structure, packings, high-frequency printed boards, etc., and is also suited as it is for use as a battery binder and a material for coating compositions.

BACKGROUND ART

It is already known to concentrate an aqueous polytetrafluoroethylene dispersion by adding a surfactant to the dispersion, thereafter heating the dispersion to form a transparent aqueous solution as an upper layer and to concentrate polymer particles as contained in a lower aqueous layer, and removing the upper layer by decantation. The surfactant used is an ethylene oxide adduct of an alkylphenol (polyoxyethylene alkyl phenyl ether). However, the concentrated dispersion has many problems, such as those given below, for use in impregnating fibrous base materials.

(1) In the impregnating-baking step, the surfactant thermally decomposes, converting into a harmful organic aromatic compound (such as benzene, toluene or xylene) as an exhaust gas to cause air pollution.

(2) The surfactant partially undergoes thermal decomposition to produce a tarlike substance, which accumulates on the inner wall of the baking furnace of the impregnating-baking apparatus. The substance falls onto or adheres to the fibrous base material passing through the furnace to lower the yield from the viewpoint of quality.

(3) The surfactant, which is difficult to thermally decompose or dissipate, partly remains in the fibrous base material after baking, assuming a brown color to seriously impair the hand of the impregnated material.

(4) Because the remaining portion of the surfactant is carbonized, use of the impregnated material in preparing high-frequency printed boards entails impaired electric characteristics.

When the dispersion is used as a battery binder, the surfactant is left undissipated almost entirely under the drying condition (about 250 to about 300° C.) for the electrode material, remaining in the electrode material and contributing to impaired performance.

To solve these problems, aqueous polytetrafluoroethylene dispersion compositions are known in which an ethoxylated aliphatic alcohol (polyoxyethylene alkyl ether) is used (see, for example, JP-B-21532/1977). It is known that polyoxyethylene alkyl ethers are lower than polyoxyethylene alkyl phenyl ethers in decomposition temperature, therefore readily dissipate on thermal decomposition in many cases, are less likely to remain in polymers, and form films which are apparently advantageous in yellow index of plastics (ASTM D-1925-63T) measured.

Polyoxyethylene alkyl ethers, which contain no benzene ring in the structure, do not convert into a harmful organic aromatic compound (such as benzene, toluene or xylene) on thermal decomposition, giving rise to no air pollution. Thus, the aqueous polytetrafluoroethylene dispersion comprising a polyoxyethylene alkyl ether has various advantages and yet is not in wide use because in the field of fibrous base materials impregnated with aqueous polytetrafluoroethylene dispersions wherein the dispersion is used most frequently, the following properties are required of the dispersion.

(1) For impregnation, the dispersion is relatively stabilized in viscosity and low in viscosity-temperature dependence.

(2) The dispersion has a relatively low viscosity of 10 to 30 cp at room temperature (25° C.) and smoothly penetrates into fibrous base materials.

(3) When the dispersion is repeatedly applied in layers, the resulting coating still remains free of cissing or coagulation.

JP-B-21532/1977 mentions nothing about such impregnation.

We have conducted intensive research on the invention of JP-B-21532/1977 and found that this invention is characterized by using as surfactants two kinds of polyoxyethylene alkyl ethers, i.e., one having a cloud point of up to 45° C. and the other having a cloud point at least 10° C. higher than the former and not lower than 50° C. Examples of the invention indicate that the ethylene oxide content is as high as 73.5 to 82 wt. % to give marked hydrophilic properties, such that when the composition is applied repeatedly, cissing occurs.

An object of the present invention is to provide an aqueous polyoxyethylene alkyl ether dispersion composition having excellent impregnating properties, releasing none of harmful organic aromatic compounds such as benzene into the atmosphere and less likely to cause pollution.

Another object of the invention is to provide a coated product which is diminished in the amount of residue (carbide) of a surfactant, has good hand (high degree of whiteness) and is also excellent in electric properties.

Another object of the invention is to provide a binder for use in batteries which is excellent in electric characteristics, or a coating composition for giving a clear color of high lightness.

DISCLOSURE OF THE INVENTION

The present invention provides an aqueous dispersion composition comprising polytetrafluoroethylene and a surfactant, the aqueous polytetrafluoroethylene dispersion composition being characterized in that the composition has a polytetrafluoroethylene concentration of 30 to 65 wt. %, the surfactant comprising a polyoxyethylene alkyl ether represented by the formula

wherein R is a saturated or unsaturated hydrocarbon group having 8 to 18 carbon atoms, and n is 5 to 18, having a cloud point of over 45° C. to not higher than 85° C. and containing 65 to 70 wt. % of ethylene oxide in the molecule, the concentration of the surfactant being 2 to 10 wt. % based on the polytetrafluoroethylene. The invention relates also to the use of the composition.

Although the polytetrafluoroethylene present in the aqueous polytetrafluoroethylene dispersion of the present invention can be of any particle size, the preferred particle size is usually 0.15 to 0.40 μm. The aqueous polytetrafluoroethylene dispersion as prepared, which generally contains 25 to 35 wt. % of polytetrafluoroethylene, is heated in the presence of the surfactant specified above and thereby separated into two la obtain the desired concentrated aqueous polytetrafluoroethylene dispersion containing 30 to 65 wt. % of polytetrafluoroethylene.

The polytetrafluoroethylene includes not only a homopolymer of polytetrafluoroethylene but also a modified polytetrafluoroethylene prepared by copolymerizing tetrafluoroethylene with other copolymerizable monomer in a small amount that will not impart fluidity to the modified product on melting. Examples of such copolymerizable monomers are hexafluoropropene, chlorotrifluoroethylene, perfluoro(alkyl vinyl ether), perfluoro(alkoxy vinyl ether), trifluoroethylene and perfluoroalkylethylene. While the proportion of the monomer to be copolymerized varies depending on the kind of the monomer, for example, a perfluoro (alkyl vinyl ether) or perfluoro(alkoxy vinyl ether) is used for copolymerization usually in an amount of up to 2 wt. %, preferably 0.01 to 1 wt. %.

The surfactant to be used in the invention is represented by the formula $$RO(CH_2CH_2O)nH$$

wherein R is a saturated or unsaturated hydrocarbon group having 8 to 18 carbon atoms, and n is 5 to 18, has a cloud point of over 45° C. to not higher than 85° C. and contains 65 to 70 wt. % of ethylene oxide in the molecule. Examples of preferable hydrocarbon groups are octyl, decyl, tridecyl, stearyl, lauryl, cetyl and oleyl. It is important that the surfactant have a cloud point of over 45° C. to not higher than 85° C. and contain 65 to 70 wt. %, preferably 65.5 to 68 wt. %, of ethylene oxide in the molecule. One or at least two surfactants of the type described are usable. When the aqueous dispersion is concentrated by the method described, the surfactant becomes incorporated in the resulting concentrate in an amount of at least 2%. If the surfactant content exceeds 10%, the surfactant gives the aqueous dispersion prepared an increased viscosity and impaired viscosity-temperature dependence, apparently remaining in the fibrous base material impregnated with the dispersion to produce an undesirable result.

In impregnating fibrous base materials with the aqueous polytetrafluoroethylene dispersion, the ethylene oxide content of the surfactant exerts a great influence not only on the basic properties of the dispersion such as viscosity and viscosity-temperature dependence but also on the impregnating properties thereof such as the wetting property and surface tension of the polymer.

When the surfactant, i.e., polyoxyethylene alkyl ether, as used singly or in the form of a mixture for the aqueous polytetrafluoroethylene dispersion is less than 65 wt. % in ethylene oxide content, the dispersion has an excessively high viscosity at room temperature (25° C.) and is not suited to impregnation. If the fibrous base material is impregnated with the dispersion, an excess of resin will deposited on the fibers by a single application, rendering the coating liable to develop mud cracks. Such an aqueous dispersion exhibits great viscosity-temperature dependence as shown in FIG. 1, is prone to become more viscous with a slight rise in temperature, and is difficult to control in viscosity.

The amount of resin to be deposited on the base material per application by impregnation depends largely on the viscosity of the aqueous dispersion, and when having great viscosity-temperature dependence, the aqueous dispersion has problems in quality.

If the ethylene oxide content exceeds 70 wt. %, on the other hand, the dispersion becomes excessively hydrophilic, with the result that when the fibrous base material impregnated with the dispersion the second time and further repeatedly, cissing is likely to occur on the polytetrafluoroethylene coating on the base material.

Similarly, the cloud point of the surfactant is also an important factor. Generally the cloud point rises with an increase in the number of moles added of ethylene oxide which is the hydrophilic group of the surfactant. For the reason already given, therefore, the cloud point also affects the impregnating properties. According to JP-B-21532/ 1977, a polyoxyethylene alkyl ether of low cloud point (30 to 45° C.) is used in concentrating an aqueous polytetrafluoroethylene dispersion, and a surfactant of high cloud point is added to give improved storage stability at room temperature (25° C.)

However, the cloud point of the former surfactant is approximate to room temperature and too low, so that even if the aqueous dispersion is allowed to cool to room temperature, it is difficult to obtain a transparent supernatant after concentration and to separate off a concentrated aqueous polytetrafluoroethylene dispersion. Furthermore, since the supernatant occurs readily at room temperature (further progress of concentration), the latter surfactant must be added in an early stage for stabilization. Consequently, although a highly concentrated aqueous polytetrafluoroethylene dispersion is available from the concentration step, addition of an aqueous solution of the latter surfactant reduces the concentration of polytetrafluoroethylene in the aqueous dispersion, conversely increasing the surfactant concentration.

On the other hand, the polyoxyethylene alkyl ether having a cloud point of over 45° C. to not higher than 85° C. and used in the invention affords an aqueous polytetrafluoroethylene dispersion having a relatively high storage stability without adding the latter surfactant or with use of only a small amount of the latter surfactant.

More specifically, the aqueous polytetrafluoroethylene dispersion of the invention can be obtained, for example, by heating an aqueous polytetrafluoroethylene dispersion immediately after the preparation thereof in the presence of a polyoxyethylene alkyl ether represented by the formula $$RO(CH_2CH_2O)nH$$

wherein R is a saturated or unsaturated hydrocarbon group having 8 to 18 carbon atoms, and n is 5 to 18, having a cloud point of over 45° C. to not higher than 85° C. and containing 65 to 70 wt. % of ethylene oxide in the molecule to separate the dispersion into two layers and obtain a concentrated aqueous polytetrafluoroethylene dispersion containing 30 to 65% of polytetrafluoroethylene, and adding to the dispersion a small amount of a polyoxyethylene alkyl ether represented by the formula $$RO(CH_2CH_2O)nH$$

wherein R is a saturated or unsaturated hydrocarbon group having 8 to 18 carbon atoms, and n is 5 to 18, or without adding the ether. The polyoxyethylene alkyl ether of the above formula is used singly, or such ethers are used in the form of a mixture, as will be apparent from Examples.

Thus, the invention provides an aqueous polytetrafluoroethylene dispersion having a high solids content and low surfactant concentration by a method which basically differs from the method disclosed in JP-B-21532/1977. In fields other than the field of impregnation, i.e., in the field, for example, of battery binders, there is a demand for such aqueous polytetrafluoroethylene dispersions. While the aqueous polytetrafluoroethylene dispersion of the invention is useful, for example, for coating fibrous base materials to prepare conveyor belts, roof materials (tent fabrics) of buildings of architectural fabric structure, packings, high-frequency printed boards, etc., the dispersion is also suited for use as a battery binder and material for coating compositions.

Examples of base materials are glass fibers, Kevlar fibers, carbon fibers, ceramic fibers, metal fibers, silicon carbide fibers, etc. An electrode material for batteries, for example, for nonaqueous electrolyte cells called lithium cells wherein Li is used as the negative electrode active substance is prepared by adding 1 to 20% of polytetrafluoroethylene to a powder of positive electrode active substance such as carbon fluoride or manganese dioxide, kneading the mixture with heating and rolling the mixture. At this time, the polytetrafluoroethylene is supplied in the form of an aqueous dispersion, and the desired surfactant is one which is easily thermally decomposable.

Pigments, solvents, additives, etc. are usable for preparing coating compositions. Suitable pigments are those having such thermal resistance as to free of degradation at temperatures not lower than the melting point of polytetrafluoroethylene. Stated more specifically, examples of inorganic pigments usable are compound oxide pigments comprising combinations of oxides of Cr, Ti, Co, Ni, Fe, Mn, Cu, Sb, etc., calcined pigments such as cadmium pigments, carbon black, ultramarine, etc. Examples of organic pigments usable are Phthalocianine Blue, Phthalocyanine Green, perylene-type pigments, etc. as improved in heat resistance. The pigment is used in an amount of about 1 to about 40 wt. % based on the weight of polytetrafluoroethylene. It is usually desired that the pigment be added in the form of a slurry. Also usable are commercial aqueous coloring agents intended for fluorine-containing resins and containing about 1 to about 50 wt. % of such pigments.

Examples of useful solvents are N,N-dimethylformamide, N,N-dimethylacetamide, N-methyl-2-pyrrolidone, dimethyl sulfoxide, methyl ethyl ketone, methyl glycol acetate, 2-nitropropane, ethylene glycol acetate, toluene, etc.

Examples of additives are fillers such as glass, talc, mica, clay, $SiO_2$, $TiO_2$, $Al_2O_3$ and ceramic compounds, thickeners such as methyl cellulose, coating composition additives such as leveling agents, etc. Such additives can be used in an amount of 0.1 to 40 parts per 100 parts of the dispersion. The coating composition obtained can be used as such for metal cooking utensils (frying pans), household electric devices such as irons and jars, industrial machines such as copying machine rolls.

BEST MODE OF CARRYING OUT THE INVENTION

Figure 1:
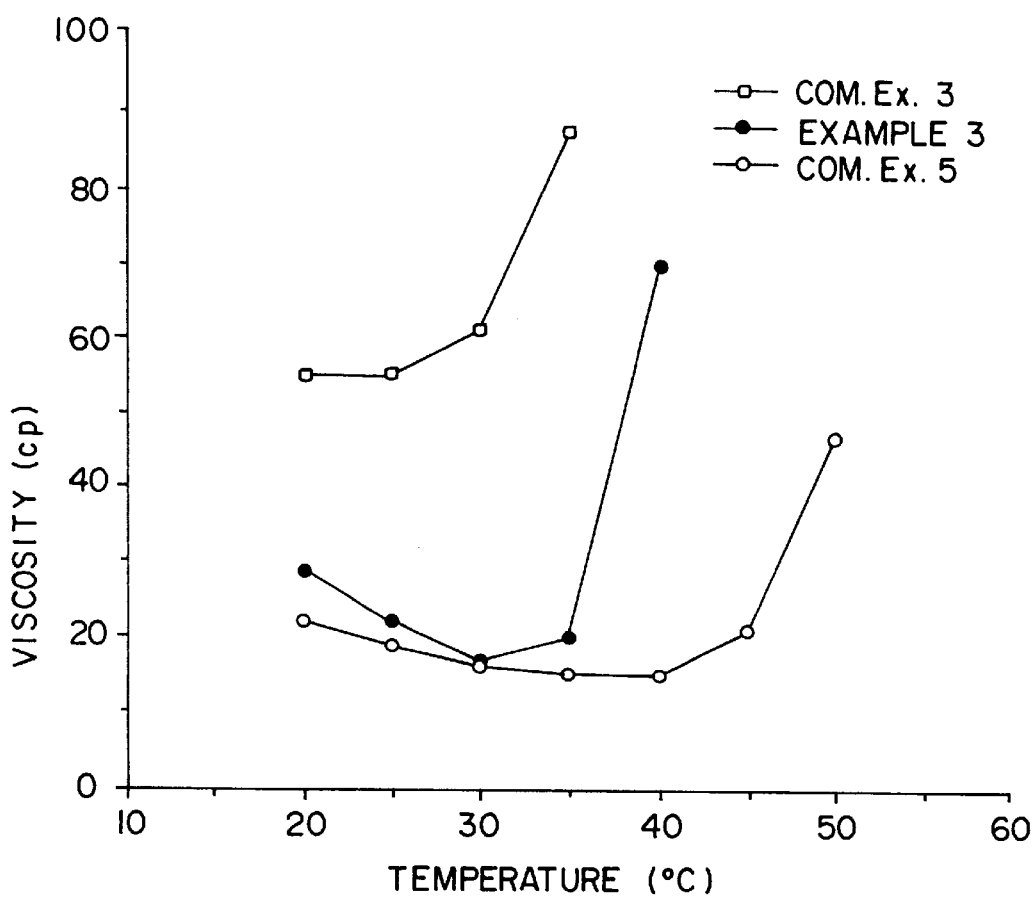
FIG. 1 is a graph showing the viscosity-temperature dependence of aqueous polytetrafluoroethylene dispersions of Example 3 and Comparative Examples 3 and 5.

The present invention will be described in greater detail with reference to the following examples. The percentages are by weight unless otherwise specified. The amounts of the components used other than that of fluorine-containing resin are all expressed in percent by weight based on the weight of the fluorine-containing resin. In the following description, HLB=ethylene content/5.

EXAMPLE 1

A starting aqueous dispersion of polytetrafluoroethylene particles was prepared by an emulsion polymerization process wherein tetrafluoroethylene was polymerized with stirring under pressure in an aqueous solution of polymerization emulsifier such as ammonium polyfluorocarboxylate in the presence of ammonium persulfate or succinic acid peroxide serving as a polymerization initiator. The dispersion contained 30% of the polymer based on the weight of the dispersion, and the polymer was 0.20 μm in mean particle diameter. To the dispersion was added 10% (based on the weight of solids of the polymer) of a nonionic surfactant represented by $C_{13}H_{27}O(CH_2CH_2O)nH$ [registered trademark "DISPANOL TOC" (product of Nippon Oils & Fats Co., Ltd.), about 8.5 in n, the number of moles of ethylene oxide added, 49° C. in cloud point and 65% in calculated ethylene oxide content]. Aqueous ammonia was further added to the dispersion in an amount sufficient to raise the pH of the dispersion from about 3 to about 10. The resulting dispersion was gently stirred for several minutes, heated at 55° C. and allowed to stand for 24 hours. A transparent supernatant produced was removed to obtain a concentrated dispersion, which was about 70% in solids content and about 2.7% in surfactant (DISPANOL TOC) content based on the weight of the dispersion.

To 1 liter of this dispersion as a specimen was further added about 3.3% of DISPANOL TOC to adjust the specimen to a solids content of about 60% and surfactant content of about 6%.

EXAMPLE 2

The same procedure as in Example 1 was repeated with the exception of changing the nonionic surfactant from DISPANOL TOC to a surfactant represented by $C_{13}H_{27}O(CH_2CH_2O)nH$ [product of Nippon Oils & Fats Co., Ltd., about 9.5 in n, 58.8° C. in cloud point and 65.5% in calculated ethylene oxide content]. The dispersion concentrate obtained was about 66% in solids content and about 2.4% in surfactant content based on the weight of the dispersion. To 1 liter of this dispersion as a specimen was further added 3.6% of the surfactant to adjust the specimen to a solids content of about 60% and surfactant content of about 6%.

EXAMPLE 3

The concentration procedure of Example 1 was repeated. To 1 liter of the dispersion as a specimen were added about 2% of DISPANOL TOC, and about 1.3% of a nonionic surfactant represented by $C_{12}H_{25}O(CH_2CH_2O)nH$ [registered trademark "EMULGEN 120" (product of Kao Co., Ltd.), about 11.7 in n, 98° C. in cloud point and 76% in calculated ethylene oxide content] to adjust the specimen to a solids content of about 60% and surfactant content of about 6%. The ethylene oxide content of the surfactant mixture in the dispersion was 67.5%.

EXAMPLE 4

The same procedure as in Example 1 was repeated with the exception of changing the nonionic surfactant from DISPANOL TOC to a surfactant represented by $C_{13}H_{27}O(CH_2CH_2O)nH$ [product of Nippon Oils & Fats Co., Ltd., about 10.5 in n, 72.6° C. in cloud point and 68.0% in calculated ethylene oxide content]. The dispersion concentrate obtained was about 65% in solids content and about 2.5% in surfactant content. To 1 liter of this dispersion as a specimen was further added 3.5% of the surfactant to adjust the specimen to a solids content of about 60% and surfactant content of about 6%.

COMPARATIVE EXAMPLE 1

The same concentration procedure as in Example 1 was repeated with the exception of changing the nonionic surfactant from DISPANOL TOC to Nonion P-208 [$C_{16}H_{33}O(CH_2CH_2O)nH$, product of Nippon Oils & Fats Co., Ltd., about 8.0 in n, 48° C. in cloud point and 59.5% in calculated ethylene oxide content], whereas it was impossible to obtain any concentrate.

COMPARATIVE EXAMPLE 2

The same concentration procedure as in Example 1 was performed with the exception of changing the surfactant from DISPANOL TOC to EMULGEN 108 [$C_{12}H_{25}O(CH_2CH_2O)nH$, product of Kao Co., Ltd., about 6.3 in n, 40° C. in cloud point and 60.5% in calculated ethylene oxide content], whereas it was difficult to detect the interface between the concentrated aqueous polytetrafluoroethylene dispersion and the supernatant. The resulting dispersion was 61.5% in solids content and 2.5% in surfactant content. To 1 liter of this dispersion as a specimen was further added 3.5% of the surfactant to adjust the specimen to a solids content of about 60% and surfactant content of about 6%. The dispersion obtained had an excessively high viscosity and deposited an increased amount of resin by a single application when tested for impregnation, consequently developing mud cracks and faults in the coating.

COMPARATIVE EXAMPLE 3

The same concentration procedure of Example 1 was performed using a lot, lower in cloud point, of the surfactant DISPANOL TOC (product of Nippon Oils & Fats Co., Ltd.), i.e., $C_{13}H_{27}O(CH_2CH_2O)nH$ [about 8.3 in n, 44.5° C. in cloud point and 64.5% in calculated ethylene oxide content]. The dispersion concentrate obtained was about 69.3% in solids content and about 2.9% in surfactant content based on the weight of the dispersion. To 1 liter of this dispersion as a specimen was further added 3.1% of the surfactant to adjust the specimen to a solids content of about 60% and surfactant content of about 6% . The dispersion obtained had a slightly high viscosity of 55 cp at 25° C. The dispersion had great viscosity-temperature dependence as shown in FIG. 1, increasing in viscosity with a slight rise in temperature. Like the dispersion of Comparative Example 2, this dispersion was not suited for impregnation.

COMPARATIVE EXAMPLE 4

For comparison, the same concentration procedure as above was performed with the exception of replacing DISPANOL TOC by Triton X-100 [$C_8H_{17}C_6H_4O(CH_2CH_2O)nH$, product of Union Carbide Corporation, about 9.0 in n, 65° C. in cloud point and 67.5% in ethylene oxide content] to obtain a dispersion having a solids content of about 65% and surfactant content of about 3.2% . To the dispersion was added 2.8% of Triton X-100 to adjust the dispersion to a solids content of about 60% and surfactant content of about 6% . The dispersion had the problem of air pollution and faults such as impaired hand.

COMPARATIVE EXAMPLE 5

The concentration procedure of Example 1 was repeated. To 1 liter of the dispersion as a specimen were added about 0.4% of DISPANOL TOC, and about 2.9% of a nonionic surfactant represented by $C_{12}H_{25}O(CH_2CH_2O)nH$ [registered trademark "EMULGEN 120" (product of Kao Co., Ltd.), about 11.7 in n, 98° C. in cloud point and about 76.5% in calculated ethylene oxide content] to adjust the specimen to a solids content of about 60% and surfactant content of about 6%. The ethylene oxide content of the surfactant mixture in the dispersion was 70.5%. When the dispersion obtained was repeatedly applied to a base material in an impregnation test, cissing occurred on the second and subsequent polytetrafuoroethylene coatings on the base material.

COMPARATIVE EXAMPLE 6

The same procedure as in Example 1 was performed except that the surfactant used was $C_8H_{17}O(CH_2CH_2O)nH$ [product of Nippon Oils & Fats Co., Ltd., about 7.0 in n, 67.6° C. in cloud point and 70.5% in calculated ethylene oxide content], whereas it was impossible to obtain any concentrate.

TABLE 1

|  | Example | |
|---|---|---|
|  | 1 | 2 |
| surfactant for concentration | | |
| kind | $C_{13}H_{27}O(CH_2CH_2O)nH$ | $C_{13}H_{27}O(CH_2CH_2O)nH$ |
| n | 8.5 | 9.5 |
| amount | 10% | 10% |
| cloud point | 49° C. | 58.8° C. |
| EO content | 65% | 65.5% |
| HLB | 13.0 | 13.1 |
| dispersion concentrate | | |
| solid content | 70% | 66% |
| surfactant content | 2.7% | 2.4% |
| surfactant for adjustment | | |
| kind | $C_{13}H_{27}O(CH_2CH_2O)nH$ | $C_{13}H_{27}O(CH_2CH_2O)nH$ |
| n | 8.5 | 9.5 |
| amount | 3.3% | 3.6% |
| cloud point | 49° C. | 58.8° C. |
| EO content | 65% | 65.5% |
| HLB | 13.0 | 13.1 |
| dispersion prepared | | |
| solid content | 60.3% | 60.0% |
| surfactant content | 5.8% | 5.9% |
| viscosity | 18.5 cp | 22.0 cp |
| pH | 9.4 | 9.8 |
| specific gravity | 1.522 | 1.515 |
| cloud point | 49° C. | 58.8° C. |
| EO content | 65% | 65.5% |
| HLB | 13.0 | 13.1 |

TABLE 2

|  | Example | |
|---|---|---|
|  | 3 | 4 |
| surfactant for concentration | | |
| kind | $C_{13}H_{27}O(CH_2CH_2O)nH$ | $C_{13}H_{27}O(CH_2CH_2O)nH$ |
| n | 8.5 | 10.5 |
| amount | 10% | 10% |
| cloud point | 49° C. | 72.6° C. |
| EO content | 65% | 68% |
| HLB | 13.0 | 13.5 |
| dispersion concentrate | | |
| solid content | 70% | 65% |
| surfactant content | 2.7% | 2.5% |
| surfactant for adjustment | | |
| kind | ① $C_{13}H_{27}O(CH_2CH_2O)nH$ ② $C_{13}H_{27}O(CH_2CH_2O)nH$ | $C_{13}H_{27}O(CH_2CH_2O)nH$ |
| n | ① 11.7  ② 8.5 | 10.5 |
| amount | ① 1.3%  ② 2.0% | 3.5% |
| cloud point | ① 98° C.  ② 49° C. | 72.6° C. |
| EO content | 67.5% | 68% |

TABLE 2-continued

| | Example | |
|---|---|---|
| | 3 | 4 |
| HLB | 13.5 | 13.6 |
| dispersion prepared | | |
| solid content | 60.8% | 60.2% |
| surfactant content | 6.0% | 6.4% |
| viscosity | 21.9 cp | 23.8 cp |
| pH | 9.5 | 9.4 |
| specific gravity | 1.528 | 1.518 |
| cloud point | 59.6° C. | 72.6° C. |
| EO content | 67.5% | 68.0% |
| HLB | 13.5 | 13.6 |

TABLE 3-1

| | Comparative Example | | |
|---|---|---|---|
| | 1 | 2 | 3 |
| surfactant for concentration | | | |
| kind | $C_{16}H_{33}O(CH_2CH_2O)nH$ | $C_{12}H_{25}O(CH_2CH_2O)nH$ | $C_{13}H_{27}O(CH_2CH_2O)nH$ |
| n | 8.0 | 6.3 | 8.3 |
| amount | 10% | 10% | 10% |
| cloud point | 48° C. | 40° C. | 44.5° C. |
| EO content | 59.5% | 60.5% | 64.5% |
| HLB | 11.9 | 12.1 | 12.9 |
| dispersion concentrate | | | |
| solid content | impossible to concentrate | 61.5% | 69.3% |
| surfactant content | | 2.5% | 2.9% |

TABLE 3-2

| | Comparative Example | | |
|---|---|---|---|
| | 1 | 2 | 3 |
| surfactant for adjustment | | | |
| kind | | $C_{12}H_{25}O(CH_2CH_2O)nH$ | $C_{13}H_{27}O(CH_2CH_2O)nH$ |
| n | | 6.3 | 8.3 |
| amount | | 3.5% | 3.1% |
| cloud point | | 40° C. | 44.5° C. |
| EO content | | 60.5% | 64.5% |
| HLB | | 12.1 | 12.9 |
| dispersion prepared | | | |
| solid content | | 60.0% | 60.2% |
| surfactant content | | 5.8% | 5.9% |
| viscosity | | 240 cp | 55.5 cp |
| pH | | 9.8 | 9.4 |
| specific gravity | | impossible to measure | 1.522 |
| cloud point | | 40° C. | 44.5° C. |

TABLE 4-1

| | Comparative Example | | |
|---|---|---|---|
| | 4 | 5 | 6 |
| surfactant for concentration | | | |
| kind | $C_8H_{17}C_6H_4O(CH_2CH_2O)nH$ | $C_{13}H_{27}O(CH_2CH_2O)nH$ | $C_8H_{17}O(CH_2CH_2O)nH$ |
| n | 9.0 | 8.5 | 7.0 |
| amount | 10% | 10% | 10% |
| cloud point | 65° C. | 49° C. | 67.6° C. |
| EO content | 67.5% | 65% | 70.5% |
| HLB | 13.5 | 13.0 | 14.1 |
| dispersion concentrate | | | |
| solid content | 65.0% | 70% | impossible to concentrate |
| surfactant content | 3.2% | 2.7% | |

TABLE 4-1-continued

| | Comparative Example | | |
|---|---|---|---|
| | 4 | 5 | 6 |
| surfactant for adjustment | | | |
| kind | $C_8H_{17}C_6H_4O(CH_2CH_2O)nH$ | ① $C_{12}H_{25}O(CH_2CH_2O)nH$ ② $C_{13}H_{27}O(CH_2CH_2O)nH$ | |

TABLE 4-2

| | Comparative Example | | |
|---|---|---|---|
| | 4 | 5 | 6 |
| surfactant for adjustment | | | |
| n | 9.0 | ① 11.7 | ② 8.5 |
| amount | 2.8% | ① 2.9% | ② 0.4% |
| cloud point | 65° C. | ① 98° C. | ② 49° C. |
| EO content | 67.5% | 70.5% | |
| HLB | 13.5 | 14.1 | |
| dispersion prepared | | | |
| solid content | 60.2% | 60.5% | |
| surfactant content | 6.0% | 5.8% | |
| viscosity | 21.1 cp | 24.5 cp | |
| pH | 9.6 | 9.5 | |
| specific gravity | 1.523 | 1.521 | |
| cloud point | 65° C. | 72.7° C. | |

TABLE 4-2-continued

| | Comparative Example | | |
|---|---|---|---|
| | 4 | 5 | 6 |
| EO content | 67.5% | 70.5% | |
| HLB | 13.5 | 14.1 | |

[Impregnating Properties]

Glass fibers were impregnated by the following procedure with each of the aqueous polytetrafluoroethylene dispersions obtained in the examples. Used as glass fibers was a plain-woven fabric having a yarn density of 60 warps/25 mm and 46 wefts/25 mm and a thickness of 0.05 mm and subjected to heat cleaning.

1) The fabric was impregnated with the aqueous polytetrafluoroethylene dispersion of the example once, dried at about 100° C. and baked at about 380° C. for 3 minutes.

2) The impregnated fabric was immersed in the same aqueous dispersion for impregnation, dried at about 100° C. and baked at about 380° C. for 3 minutes. In this step, the dispersion was checked for cissing on the fluorine-containing resin coating.

3) The step 2) of impregnation, drying and baking was repeated to obtain a fabric having a fluorine-containing resin content of about 60 to about 65%.

Table 5 shows the impregnating properties of the aqueous polytetrafluoroethylene dispersions of Examples and Comparative Examples. The fabrics treated with the dispersion of Example 3 or Comparative Example 4 were checked for the degree of whiteness by a color difference meter, SM color computer MODEL SM-4 (Suga Shikenki Co., Ltd.) and for light transmittance by a haze meter (Toyo Seiki Co., Ltd.). Table 6 shows the results.

TABLE 5

| | Example | | | | Comparative Example | | |
|---|---|---|---|---|---|---|---|
| | 1 | 2 | 3 | 4 | 2 | 4 | 5 |
| Wt. (g/m²) of glass fibers | 47.8 | 47.8 | 47.8 | 47.8 | 47.8 | 47.8 | 47.8 |
| first impregnation | 96.4 | 103.5 | 100.0 | 105.0 | 157.4 | 100.0 | 107.36 |
| second impregnation | 114.4 | 121.3 | 116.0 | 125.0 | — | 117.6 | entire cissing |
| third impregnation | 130.6 | 137.1 | 132.2 | 140.3 | — | 133.7 | |
| amount (g/m²) of resin deposited | 82.0 | 89.3 | 84.4 | 92.5 | 109.6 | 85.9 | |
| fluorine-containing resin content (%) | 63.4 | 65.1 | 63.8 | 65.9 | 69.6 | 64.2 | |
| impregnating properties | ○ | ○ | ○ | ○ | X | ○ | ○ |
| amenability to repeated impregnation | ○ | ○ | ○ | ○ | ○ | ○ | X |
| whiteness of fabric (as observed with unaided eye) | ◎ | ◎ | ◎ | ◎ | ○ | ○ | — |

TABLE 6

| | L value | a value | b value | light transmittance (Tt) |
|---|---|---|---|---|
| Ex. 3 | 56.95 | 0.05 | −1.24 | 63.7% |
| Com. Ex. 4 | 55.13 | 0.44 | 1.19 | 60.9% |

The L value indicates the degree of whiteness, and the a value the degree of redness. The a value indicates a reddish color when higher and a greenish color when lower. The b value indicates the degree of yellowness. The b value indicates a yellowish color when higher and a bluish color when lower. The impregnated fabric of Example 3 is smaller in the degree of yellowness and greater in the degree of whiteness than that of Comparative Example 4. This result is well in match with the result of Table 5 as to the whiteness determined with the unaided eye.

[Temperature Dependence of Viscosity]

The aqueous polytetrafluoroethylene dispersion of Example 3 and Comparative Examples 3 and 5 were heated from 20° C. to 50° C. and checked for viscosity upon rise of every 5° C. FIG. 1 shows the results. The graphs shows that the lower the ethylene oxide content, the greater is the viscosity-temperature dependence of the aqueous dispersion and the greater is the difficulty encountered in controlling the viscosity of the dispersion for use in impregnation. While base materials are actually impregnated with the dispersion usually as controlled to a temperature of about 25° C., the dispersion of Comparative Example 3 has an excessively high viscosity and is therefore unsuited for impregnation. The dispersion of Comparative Example 5 has the drawback of cissing when used for impregnation although acceptable in viscosity-temperature dependence.

INDUSTRIAL APPLICABILITY

The use of a surfactant having a specified cloud point and specified ethylene oxide content affords aqueous polytetrafluoroethylene dispersions which have good storage stability without the necessity of using an adjusting surfactant or with use of only a small amount of such surfactant.

The aqueous polytetrafluoroethylene dispersion of the invention has excellent impregnating properties and is unlikely to release any harmful organic aromatic compound such as benzene into the atmosphere.

The aqueous dispersion of the invention is further expected to provide coated articles which are diminished in the residue (carbide) of the surfactant, satisfactory in hand (high degree of whiteness) and also excellent in electric characteristics.

The aqueous dispersion of the invention further provides a binder for batteries, etc. which has high electric characteristics, or a coating composition for giving a clear color of high lightness.

What is claimed is:

1. An aqueous polytetrafluoroethylene dispersion B which is obtained by the following steps:

heating an aqueous polytetrafluoroethylene dispersion A, after the preparation thereof, with a polyoxyethylene alkyl ether represented by the formula

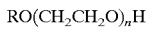

wherein R is a saturated or unsaturated hydrocarbon group having 8 to 18 carbon atoms, and n is 5 to 18, wherein said polyoxyethylene alkyl ether has a cloud point of over 45° C. to not higher than 85° C. and an ethylene oxide content of 65 to 70 wt %, to separate the dispersion A into two layers and obtain a concentrated aqueous polytetrafluoroethylene dispersion containing 30 to 65% of polytetrafluoroethylene;

recovering the concentrated aqueous polytetrafluoroethylene dispersion; and thereafter optionally mixing the concentrated aqueous polytetrafluoroethylene dispersion with an amount of a polyoxyethylene alkyl ether represented by the formula

wherein R is a saturated or unsaturated hydrocarbon group having 8 to 18 carbon atoms, and n is 5 to 18 to obtain the aqueous polytetrafluoroethylene dispersion B, wherein said amount of polvoxyethylene alkyl ether results in a concentration of 2 to 10 wt. %, based on the polytetrafluoroethylene, of the polyoxyethylene alkyl ether in the dispersion B.

2. The aqueous polytetrafluoroethylene dispersion B as defined in claim 1 wherein said ethylene oxide content of the polyoxyethylene alkyl ether is 65.5 to 68 wt %.

3. An article prepared by coating a base material with an aqueous polytetrafluoroethylene dispersion B as defined in claim 1.

4. A binder for batteries comprising an aqueous polytetrafluoroethylene dispersion B as defined in claim 1.

5. A coating composition comprising an aqueous polytetrafluoroethylene dispersion B as defined in claim 1 and a pigment, solvent or additive admixed therewith.

6. An aqueous polytetrafluoroethylene dispersion B which is obtained by the following steps:

heating an aqueous polytetrafluoroethylene dispersion A, after the preparation thereof, with a polyoxyethylene alkyl ether represented by the formula

wherein R is a saturated or unsaturated hydrocarbon group having 8 to 18 carbon atoms, and n is 5 to 18, wherein said polyoxyethylene alkyl ether has a cloud point of over 45° C. to not higher than 85° C. and an ethylene oxide content of 65 to 70 wt %, to separate the dispersion A into two layers and obtain a concentrated aqueous polytetrafluoroethylene dispersion containing 30 to 65% of polytetrafluoroethylene;

recovering the concentrated aqueous polytetrafluoroethylene dispersion; and thereafter optionally mixing the concentrated aqueous polytetrafluoroethylene dispersion with a polyoxyethylene alkyl ether represented by the formula

wherein R is a saturated or unsaturated hydrocarbon group having 8 to 18 carbon atoms, and n is 5 to 18 to obtain the aqueous polytetrafluoroethylene dispersion B.

7. The aqueous dispersion composition as defined in claim 6, wherein said ethylene oxide content of the polyoxyethylene alkyl ether is 65.5 to 68 wt %.

8. An article prepared by coating a base material with the aqueous dispersion composition as defined in claim 6.

9. A binder for batteries comprising the aqueous dispersion composition as defined in claim 6.

10. A coating composition comprising the aqueous dispersion composition as defined in claim 6 and a pigment, solvent or additive admixed therewith.

11. An aqueous dispersion composition comprising 30 to 65 wt. % of polytetrafluoroethylene and 2 to 10 wt % of a surfactant based on the polytetrafluoroethylene, wherein the surfactant comprises a polyoxyethylene alkyl ether represented by the formula

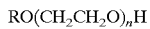

wherein R is a saturated or unsaturated hydrocarbon group having 8 to 18 carbon atoms, and n is 5 to 18, wherein the surfactant has a cloud point of over 45° C. to not higher than 85° C. and contains 65 to 70 wt. % of ethylene oxide in the polyoxyethylene alkyl ether molecule.

12. The aqueous dispersion composition as defined in claim 11, wherein said ethylene oxide content of the polyoxyethylene alkyl ether is 65.5 to 68 wt %.

13. An article prepared by coating a base material with the aqueous dispersion composition as defined in claim 11.

14. A binder for batteries comprising the aqueous dispersion composition as defined in claim 11.

15. A coating composition comprising the aqueous dispersion composition as defined in claim 11 and a pigment, solvent or additive admixed therewith.

* * * * *